Dec. 5, 1961 K. W. PFLEGER 3,011,399
COMBINED READING GLASS, LIGHT AND COMPASS
Filed Nov. 13, 1956
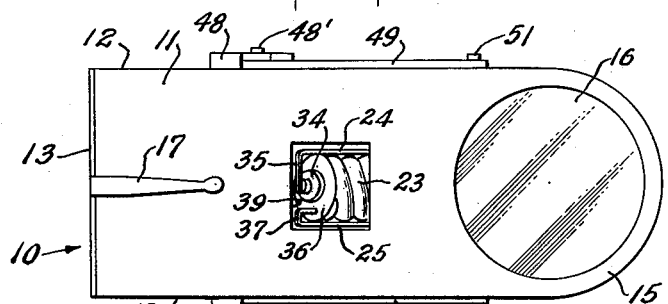
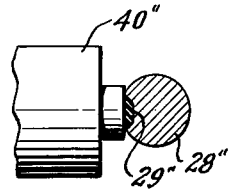
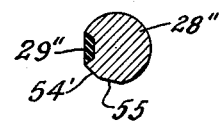
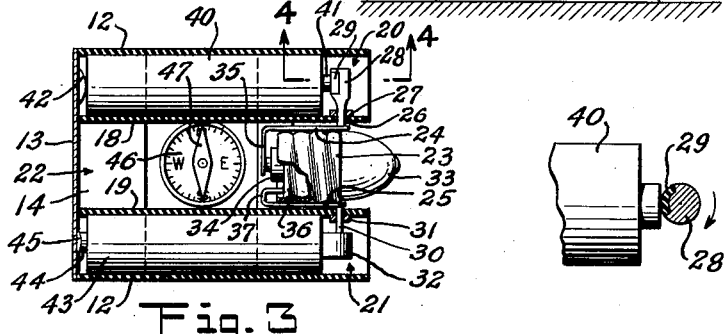
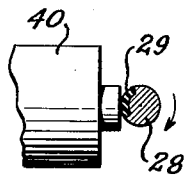
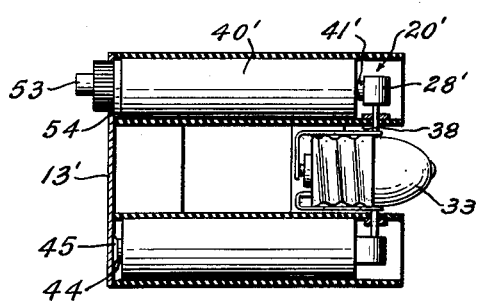
INVENTOR.
KENNETH W. PFLEGER
BY
Edw. S. Higgins
ATTORNEY United States Patent Office 3,011,399
Patented Dec. 5, 1961

3,011,399
COMBINED READING GLASS, LIGHT
AND COMPASS
Kenneth W. Pfleger, 12 Alpine Place, Kearny, N.J.
Filed Nov. 13, 1956, Ser. No. 621,904
2 Claims. (Cl. 88—39)

This invention relates generally to magnifying and illuminating devices, and more particularly to a combined magnifying lens, flashlight and magnetic compass.

A principal object of the present invention is to combine in one handy structure a magnifying lens, a source of illumination in such form and manner that the light rays will be substantially concentrated beneath the lens and not be broadly dissipated outside the area being examined, and a magnetic compass movable into and out of focus with the light rays.

Another object of the invention is to provide a lens with a casing serving as a handle therefor, a battery-operated flashlight hingedly mounted on the lens casing so that the plane of the body of the flashlight may be moved into alignment with the plane of the lens casing in order to reduce the overall thickness of the device, and a magnetic compass hingedly mounted on the lens casing and adapted to be moved into alignment with the plane of the lens casing in order to reduce the overall thickness of the device.

A further object of the invention is to provide a clip or clamp on the device so that it may be clamped to a pocket or any other suitable support.

Yet another object is to provide a portable unitary structure combining a magnifying glass lens and a flashlight with a magnetic compass, the latter being hinged to the lens unit and swingable into nested relationship with the lens for reducing the overall thickness of the structure.

A still further object of the invention is to provide a portable unitary structure combining a magnifying glass lens unit and a flashlight unit with a magnetic compass hinged to the lens unit for providing a compact and symmetrical structure capable of being readily inserted into and removed from a pocket in the clothes of the user, and capable of being readily inserted into a purse or the like, taking up a minimum of space therein.

It is further proposed to provide a combined, lens, flashlight and magnetic compass in which the device assumes the optimum locations for light and lens and which only requires one hand to manipulate.

Other objects of the invention are to provide a combined pocket flashlight and magnifying lens which is simple in construction, compact, free of outside wires, pleasing in appearance and economical to manufacture.

For a further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1 is a top plan view of a combined lens, flashlight and magnetic compass embodying one form of my invention.

FIG. 2 is a side elevational view thereof showing the compass and lamp in operative position, in dash lines, parts being shown broken away.

FIG. 3 is a horizontal sectional view taken on the plane of the line 3—3 of FIG. 2, showing the lamp in inoperative position, the compass parts being omitted.

FIG. 4 is an enlarged fragmentary detail view showing the commutator switch.

FIG. 5 is a wiring diagram showing the circuit of the device of FIG. 1.

FIG. 6 is a view similar to FIG. 3 but showing a modified form of switching arrangement.

FIG. 7 is a view similar to FIG. 4 but showing a modified form of commutator switch.

FIG. 8 is a sectional view of a still further modified form of commutator switch.

Referring to the drawings in detail, in FIGS. 1 to 5, inclusive, there is shown a lens casing 10 having a top wall 11, side walls 12, rear wall 13 and bottom wall 14. The top wall is formed with an extension 15 at its front end and supported by said extension is a magnifying glass lens 16. The casing is formed of insulating material except the rear wall 13 which is formed on conducting material and is removably secured to the casing in any suitable manner. A clip or clamp 17 is secured to the surface of the top wall 11 of the casing.

The interior of the casing is divided by walls 18 and 19 into side compartments 20 and 21, and a central compartment 22. An internally screw-threaded plastic sleeve or socket 23 is pivotally disposed in the central compartment 22 at its front. The socket is provided with flat conductor strips 24 and 25 on the sides thereof. A metal shaft 26 is connected to one end of the strip 24, which shaft extends through an opening in the wall 18 and through a bearing member 27 in the compartment 20 and into the interior of said compartment. The inner end of the shaft 26 carries a commutator or slip ring 28 of conducting material having an insulating segment 29. A metal shaft 30 is connected to the other strip 25 and extends through an opening in the wall 19 of the casing and through a bearing member 31 in the compartment 21, and into the interior of the compartment 21 wherein it mounts a commutator or slip ring 32. A conventional electric lamp bulb 33 is adapted to be threaded into the socket 23 with its central contact 34 in engagement with the angled end 35 of the conducting strip 24 and with its base 36 in cotnact with a hooked end 37 on the conducting strip 25. Below the socket 23, the bottom wall 14 of the casing is formed with a cut-away portion or bite 38, and the top wall 11 is formed with a window 39 in order to provide clearance for the socket 23 and lamp bulb 33 when the same are swung to operative and inoperative positions.

A conventional dry cell electric battery 40 is positioned and arranged in the compartment 20 so that its protruding central contact 41 is in engagement with the commutator ring 28. A spring 42 on the inner surface of the rear wall 13 presses the contact 41 into engagement with the commutator ring.

A similar battery 43 is positioned in the compartment 21 and arranged so that the end of its casing contacts the commutator ring 32 in compartment 21 and so that its center protruding contact 44 engages a spring 45 on the inner surface of the rear wall 13 whereby the casing of the commutator is maintained in engagement with the commutator ring. By reason of this construction, the socket 23 with the lamp bulb 33 is adapted to swing on a vertical plane between the intermediate walls 18 and 19 of the casing and upwardly through the window 39 in the top wall 11 and downwardly through the bite 38 in the bottom wall 14.

The circuit for the lamp bulb 33 may be traced in FIG. 5 from the battery 40 to commutator 28, shaft 26, conductor 24, central contact 34 of the lamp bulb 33, base 36 of bulb 33, conductor 25, shaft 30, commutator 32, battery 43, spring 45, rear wall 13 and spring 42 to battery 40.

A magnetic compass 46 of any approved design including a magnetic needle 47 is suitably supported on and secured to an elongated plate or shelf 48. A pair of elongated arms 49 are pivotally connected to perforated ear members 50 on the ends of the plate 48 by pins 48' and to pivot pins 51 extending from the sides of the extension 15 of the lens casing, the arms being arranged to straddle the casing.

The radiation of the light rays of the lamp bulb 33 is confined to a downwardly and forwardly inclined direction, and the eyes of the user are protected by the material of the top wall 11 of the casing 10 from any direct rays that may come up from the lamp bulb or may be reflected from the subject copy due to light rays which strike same nearly perpendicularly.

The horizontal line in FIG. 2 indicates the surface of some material to be examined, spaced from the lens 16 at a normal reading focus. The oblique lines indicate the main direct light rays from the lamp bulb, the arrangement of the lamp bulb and lens being such that the projection of the beams of light are controlled and the more intense portion of the illuminated area is confined to that portion of the reading surface which is maginfied by the lens 16.

When it is desired to use the magnetic compass 46 for any desired purpose, such as to find a person's bearings in the darkness of night or otherwise, the compass is manually swung forwardly to a position underneath the lens 16 as shown in dash lines in FIG. 2. The lamp bulb 33 is swung to an angle of approximately 45° to the reading surface and in its movement the commutator 28 closes the circuit through the lamp whereby the light beams illuminate the face of the compass for the purpose of reading the same.

When the compass 46 is not in use, it is swung rearwardly and upwardly underneath the casing 10 to nested position underneath the casing, the side walls 12 of the casing being cut away as indicated at 52 to permit this movement. When the compass is thus collapsed, the lens and light may be used for any desired reading.

When the device is not in use and it is desired to insert the same in the pocket of a vest or the like, the arms 49 are swung in an arc to bring the compass 46 to nested position, and the lamp bulb 33 is swung so that the body thereof is in a plane with the plane of the body of the casing 10. When the compass and lamp bulb are in such collapsed position, the device is free from projecting portions and may be readily inserted into a vest pocket or removed therefrom. The device is held in the pocket by the clip 17.

In the modified form of the invention shown in FIG. 6, the battery 40' in compartment 20' is provided with a push button switch member 53 which projects outwardly through an opening 54 in the rear wall 13'. The projecting central contact 41' of the battery engages a commutator 28' which is formed entirely of conducting material. In this form, the circuit is closed by pushing the button 53 and may be traced similarly to the circuit of the form shown in FIG. 5.

In all other respects, the form of invention shown in FIG. 6 is similar to the form shown in FIG. 1 and similar reference numerals are used to indicate similar parts.

Referring now to FIG. 7, when the switch 53 is omitted and it is desired to use the commutator 28", friction on the bearing surface of the commutator is used to hold the shaft 26 in any desired position. For this purpose, the front surface of the insulating segment 29" carried by the commutator or slip ring 28" is straight or flat in accordance with the form shown in FIG. 7. In using this form, the battery 40 is pushed by spring 42 against the flat surface of segment 29". The flat surface tends to prevent rotation of the shaft 26 while the flashlight is carried in the pocket. Consequently the lamp does not light and the battery is not wasted while the commutator is in this position. It requires appreciable applied torque to rotate the shaft 26 so that the conducting portion of the commutator 28" is in contact with the end of the battery.

The modified form of commutator or slip ring 28" shown in FIG. 8 differs from the form shown in FIG. 7 in that the commutator is formed with a flat surface 54' adjacent one side of the segment 29" and with another flat surface 55 adjacent surface 54', the surfaces lying on intersecting planes. By means of these surfaces 54' and 55, the lamp may be firmly directed in a plurality of directions, one at a time as may be desired by the user so that if the hand of the user shakes or other unwanted vibrations occur as might arise during a ride on a railroad train or automobile, the lamp remains firmly in the desired position.

Similar flat surfaces may be provided, if desired, on the commutator or slip ring 32.

It will be seen that the device is portable and is capable of being used with only one hand for a variety of purposes, such as reading fine print in telephone directories, or fine print in other works, searching for mechanical imperfections in miniaturized telephone office equipment, working on complex equipment or on watches, jewelry, engravings and typesetting, performing delicate surgical operations, for detective work of all kinds, and for numerous other purposes.

While I have illustrated and described the preferred embodiments of my invention, it is to be understood that I do not limit myself to the precise constructions herein disclosed and the right is reserved to all changes and modifications as defined in the appended claims.

I claim:

1. A magnifying and illuminating device comprising an elongated substantially flat casing having spaced compartments therein, in side by side relation, and extending lengthwise thereof, a magnifying viewing lens supported at one end of the casing, electric batteries removably mounted in said compartments, an insulating open-ended lamp bulb socket pivotally mounted on the casing in the space between the sides of the compartments, a substantially cylindrical lamp bulb in said socket, the longitudinal axis of said bulb being parallel to the longitudinal axes of the batteries, and means for operatively connecting the lamp bulb to the batteries including conducting strips carried by said socket, one of said conducting strips being adapted to contact the central terminal of said lamp bulb, the other of said conducting strips being adapted to contact the side terminal of said lamp bulb, shafts journalled in the compartment walls and being connected to said conducting strips and extending into said compartments, commutators connected to said shafts in said compartments, one of said commutators being in continuous contact with one of said batteries, the other of said commutators being adapted to be moved into contact with the other battery upon movement of the lamp bulb, said socket and lamp bulb being normally confined within the space between the compartments and disposed parallel to the batteries and with their axes in line with the longitudinal center line of the casing.

2. A magnifying and illuminating device comprising an elongated casing having spaced compartments therein, and along the sides thereof, a magnifying viewing lens supported at one end of the casing, a pair of electric batteries in said compartments, a lamp bulb pivotally mounted on said casing between said compartments, with its longitudinal axis parallel to the longitudinal axes of said batteries, and adapted to direct its light rays on an area directly under the lens, and means for operatively connecting the lamp bulb to the batteries including contact strips connected to the terminals of said bulb, commutators connected to said strips, one of said commutators being in continuous contact with one of said batteries, the other of said commutators being adapted to be moved into contact with the other battery upon movement of the flashlight lamp bulb, said first-named battery contacting commutator having a plurality of adjacent flat surfaces adapted selectively to contact the battery for frictionally holding the lamp in moved position.

References Cited in the file of this patent

UNITED STATES PATENTS

| | | |
|---|---|---|
| 2,014,266 | Sherbondy | Sept. 10, 1935 |
| 2,041,843 | Lifschitz | May 26, 1936 |
| 2,619,004 | O'Brien et al. | Nov. 25, 1952 |
| 2,712,058 | Grebey et al. | June 28, 1955 |